(12) United States Patent
Steinberg et al.

(10) Patent No.: US 8,175,966 B2
(45) Date of Patent: May 8, 2012

(54) SYSTEM AND METHOD FOR IDENTIFYING AN ALTERNATIVE PROVIDER OF TELECOMMUNICATIONS SERVICES

(75) Inventors: David A. Steinberg, Bethesda, MD (US); Frank Bennett, McLean, VA (US); Gaylyn Sarbacher, Alexandria, VA (US)

(73) Assignee: Simplexity, LLC, Philadelphia, PA (US)

( * ) Notice: Subject to any disclaimer, the term of this patent is extended or adjusted under 35 U.S.C. 154(b) by 1361 days.

(21) Appl. No.: 11/156,977

(22) Filed: Jun. 20, 2005

(65) Prior Publication Data
US 2006/0287950 A1    Dec. 21, 2006

(51) Int. Cl.
*G06Q 40/00* (2006.01)
(52) U.S. Cl. .......................... 705/39; 455/406
(58) Field of Classification Search ............... 705/39–41; 455/406
See application file for complete search history.

(56) References Cited

U.S. PATENT DOCUMENTS

| | | | |
|---|---|---|---|
| 6,785,534 B2 | 8/2004 | Ung | |
| 2002/0087674 A1 | 7/2002 | Guilford et al. | |
| 2002/0107765 A1 * | 8/2002 | Walker | 705/35 |
| 2003/0013434 A1 | 1/2003 | Rosenberg et al. | |
| 2003/0194988 A1 | 10/2003 | Knox | |
| 2004/0162058 A1 | 8/2004 | Mottes | |
| 2004/0219915 A1 | 11/2004 | Bamburak et al. | |
| 2004/0235458 A1 | 11/2004 | Walden et al. | |

OTHER PUBLICATIONS

Ramsey, Carl, & Lyon, James. (Nov. 1989). Automating The Customer Credit Decision Process. Cellular Business, 6(11), 48. ABI/Inform Global.*
Jensen, Eric. (Oct. 1993). A few strings attached. Network World, 10(42), 41. ABI/Inform Global.*
International Search Report dated Jan. 29, 2007.

* cited by examiner

*Primary Examiner* — Hani M Kazimi
(74) *Attorney, Agent, or Firm* — Patton Boggs LLP

(57) ABSTRACT

A method for selecting a service provider includes receiving a selection of a provider of telecommunications services, the selection being associated with a buyer. The method further includes determining that the buyer does not meet credit requirements of the provider and selecting at least one of a plurality of alternative providers of telecommunications services in response to determining that the buyer does not meet the credit requirements of the provider.

13 Claims, 4 Drawing Sheets

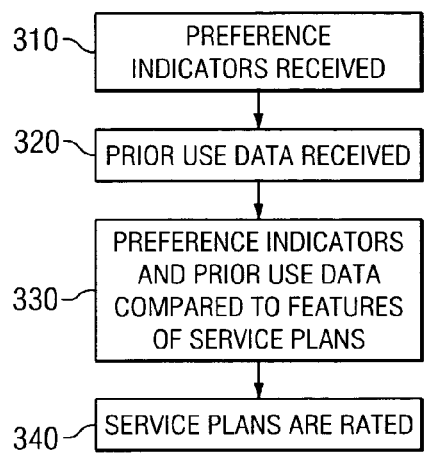

*FIG. 3*

310 — PREFERENCE INDICATORS RECEIVED

320 — PRIOR USE DATA RECEIVED

330 — PREFERENCE INDICATORS AND PRIOR USE DATA COMPARED TO FEATURES OF SERVICE PLANS

340 — SERVICE PLANS ARE RATED

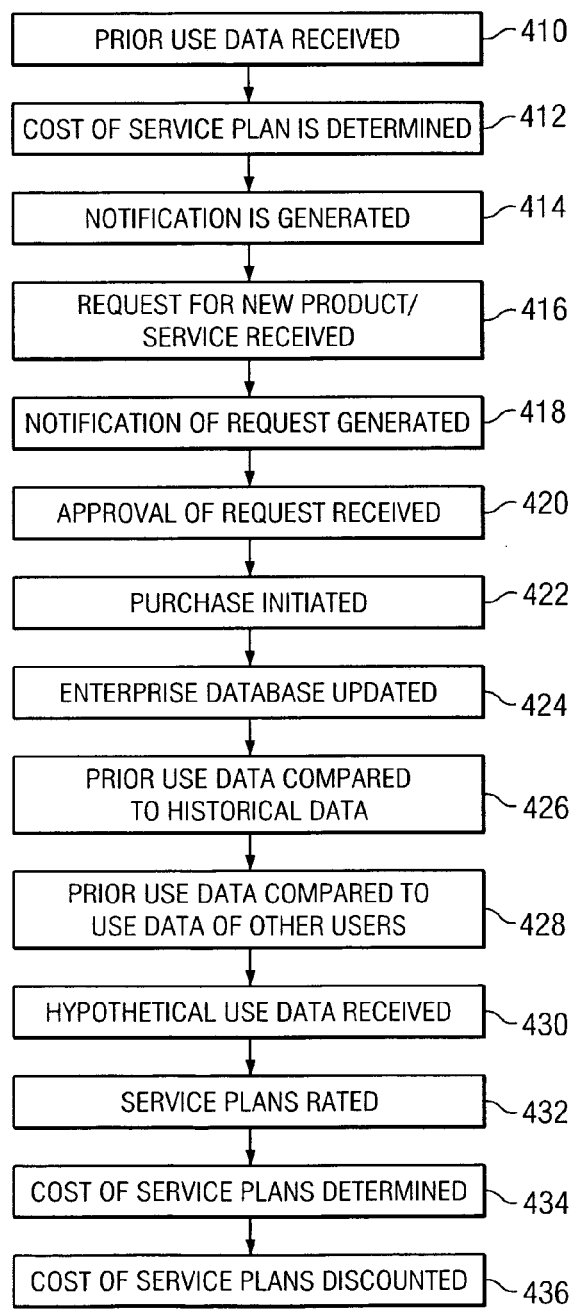

*FIG. 4*

PRIOR USE DATA RECEIVED — 410

COST OF SERVICE PLAN IS DETERMINED — 412

NOTIFICATION IS GENERATED — 414

REQUEST FOR NEW PRODUCT/ SERVICE RECEIVED — 416

NOTIFICATION OF REQUEST GENERATED — 418

APPROVAL OF REQUEST RECEIVED — 420

PURCHASE INITIATED — 422

ENTERPRISE DATABASE UPDATED — 424

PRIOR USE DATA COMPARED TO HISTORICAL DATA — 426

PRIOR USE DATA COMPARED TO USE DATA OF OTHER USERS — 428

HYPOTHETICAL USE DATA RECEIVED — 430

SERVICE PLANS RATED — 432

COST OF SERVICE PLANS DETERMINED — 434

COST OF SERVICE PLANS DISCOUNTED — 436

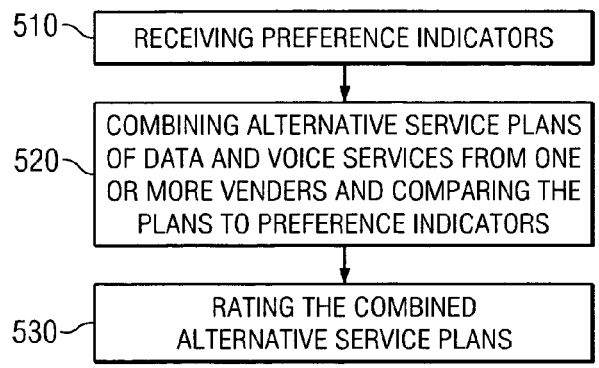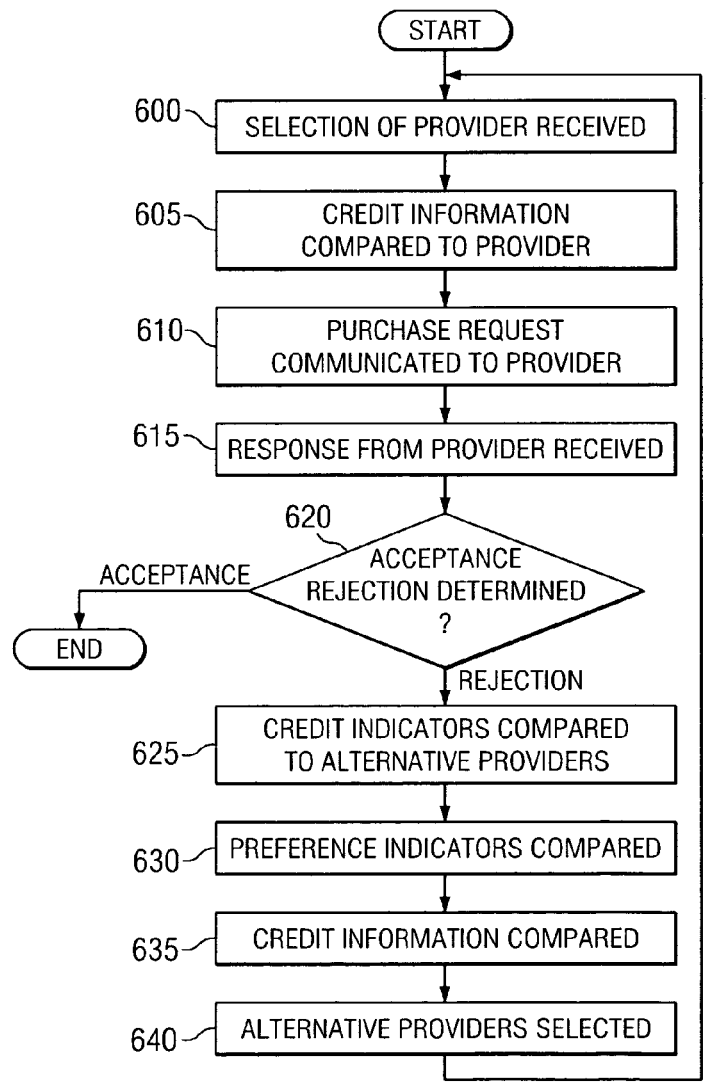

SYSTEM AND METHOD FOR IDENTIFYING AN ALTERNATIVE PROVIDER OF TELECOMMUNICATIONS SERVICES

BACKGROUND OF THE INVENTION

1. Description of Related Art

More forms of telecommunications services such as cellular telephone service, wireless Internet access service, and electronic mail service are becoming available to a wider segment of the world's population. As such services expand to such wider segment, the credit scores and financial condition of customers is becoming more of an issue both to customers desiring such services and the companies who provide the services. An effective tool is needed to better match the credit worthiness of customers to the credit requirements of service providers.

2. Technical Field of the Invention

This invention relates in general to the field of telecommunications, and more particularly to a system and method for identifying an alternative provider of telecommunications services in response to the credit worthiness of a buyer.

SUMMARY OF THE INVENTION

In accordance with the present invention, a system and method for identifying an alternative provider of telecommunications services is disclosed that offers many advantages to business enterprises and individual consumers.

In one aspect of the present invention, a method for selecting a service provider is disclosed. The method includes receiving a selection of a provider of telecommunications services, the selection being associated with a buyer. The method further includes determining that the buyer does not meet credit requirements of the provider and selecting at least one of a plurality of alternative providers of telecommunications services in response to determining that the buyer does not meet the credit requirements of the provider.

In another aspect of the present invention, a system for selecting at least one of a plurality of alternative providers of cellular telephone services is disclosed. The system includes a first database operable to store a selection of a provider of telecommunications services, the selection being associated with a buyer. The system also includes a processor in communication with the first database, the processor operable to determine that the buyer does not meet credit requirements of the provider, the processor further operable to select at least one of a plurality of alternative providers of telecommunications services in response to determining that the buyer does not meet the credit requirements of the provider.

In another aspect of the present invention, a method for tracking the relative credit difficulty of providers of telecommunications services is disclosed. The method includes receiving a selection of a provider of telecommunications services, the selection being associated with a buyer. The method further includes placing an order associated with the provider in response to such selection and receiving a reply associated with the provider indicating the buyer does not meet credit requirements of the provider. The method further includes adjusting a relative credit difficulty rating of the provider in response to the reply.

BRIEF DESCRIPTION OF THE DRAWINGS

The details of the present invention, both as to its structure and operation, can best be understood in reference to the accompanying drawings, in which like reference numerals refer to like parts, and in which:

FIG. 3 is an embodiment of a method for rating alternative service plans according to the teachings of the present invention;

FIG. 4 illustrates an additional embodiment of a method of rating alternative service plans and monitoring use of such service plans according to the teachings of the present invention;

FIG. 5 illustrates an embodiment of a method of rating alternative data and voice communication service plans according to the principles of the present invention;

FIG. 6 illustrates an embodiment of a method of selecting an alternative service provider according to the teachings of the present invention.

DETAILED DESCRIPTION

Figure 1:
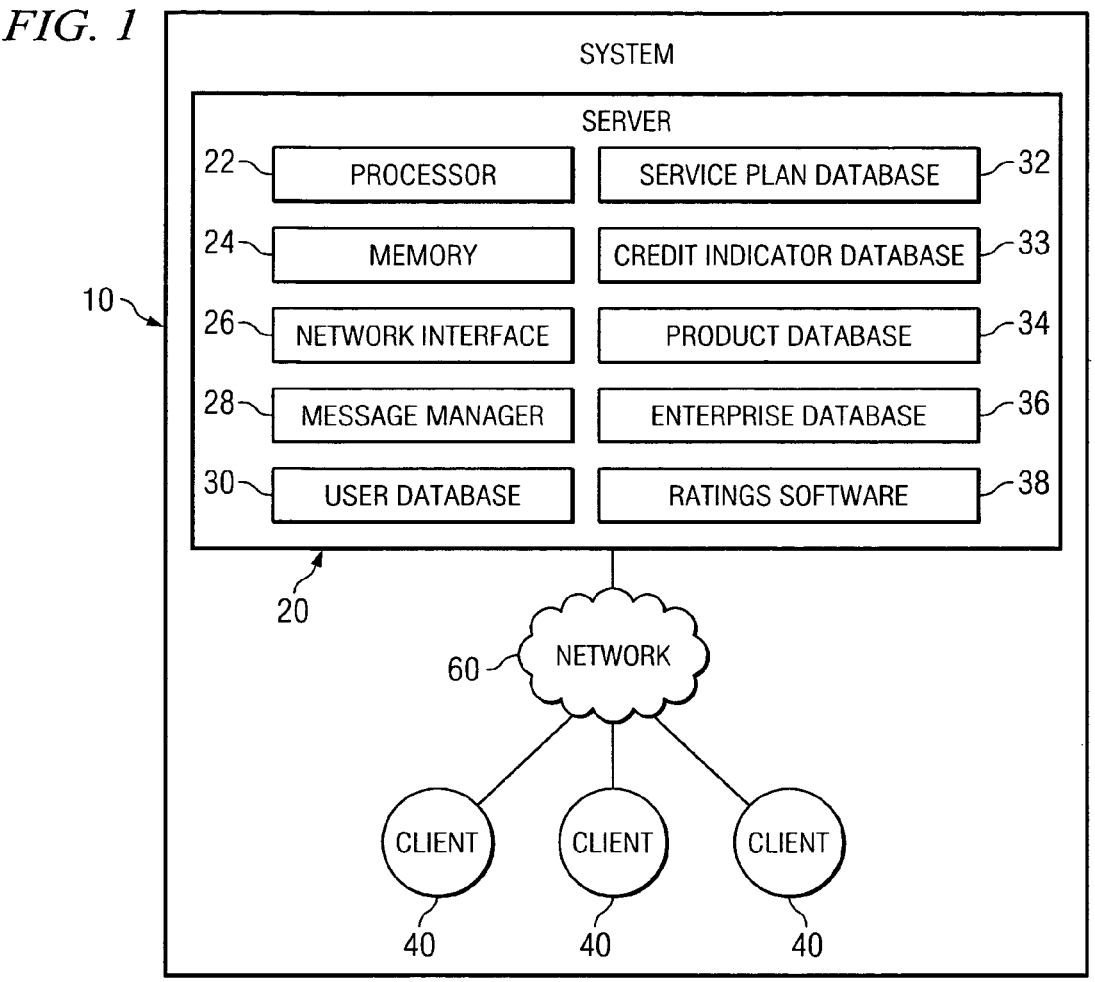
FIG. 1 is one embodiment of a system for selecting an alternative service provider and rating alternative service plans according to the teachings of the present invention.

FIG. 1 illustrates a system 10 for selecting an alternative service provider and rating alternative solutions according to the teachings of the present invention. More particularly, system 10 allows one or more users of telecommunications services, or someone making purchasing decisions on behalf of such users (each hereafter referred to as a user) to enter user information in order to select a product or service. In one embodiment of the present invention, a user with a current service plan such as a service plan for telecommunications services can "rerate" such existing plan against currently available service plans to determine if another plan is more suitable or cost effective. In another embodiment of the present invention, a user can select a service provider and be directed to an alternative service provider if the user does not meet the credit requirements of such service provider.

Figure 7:
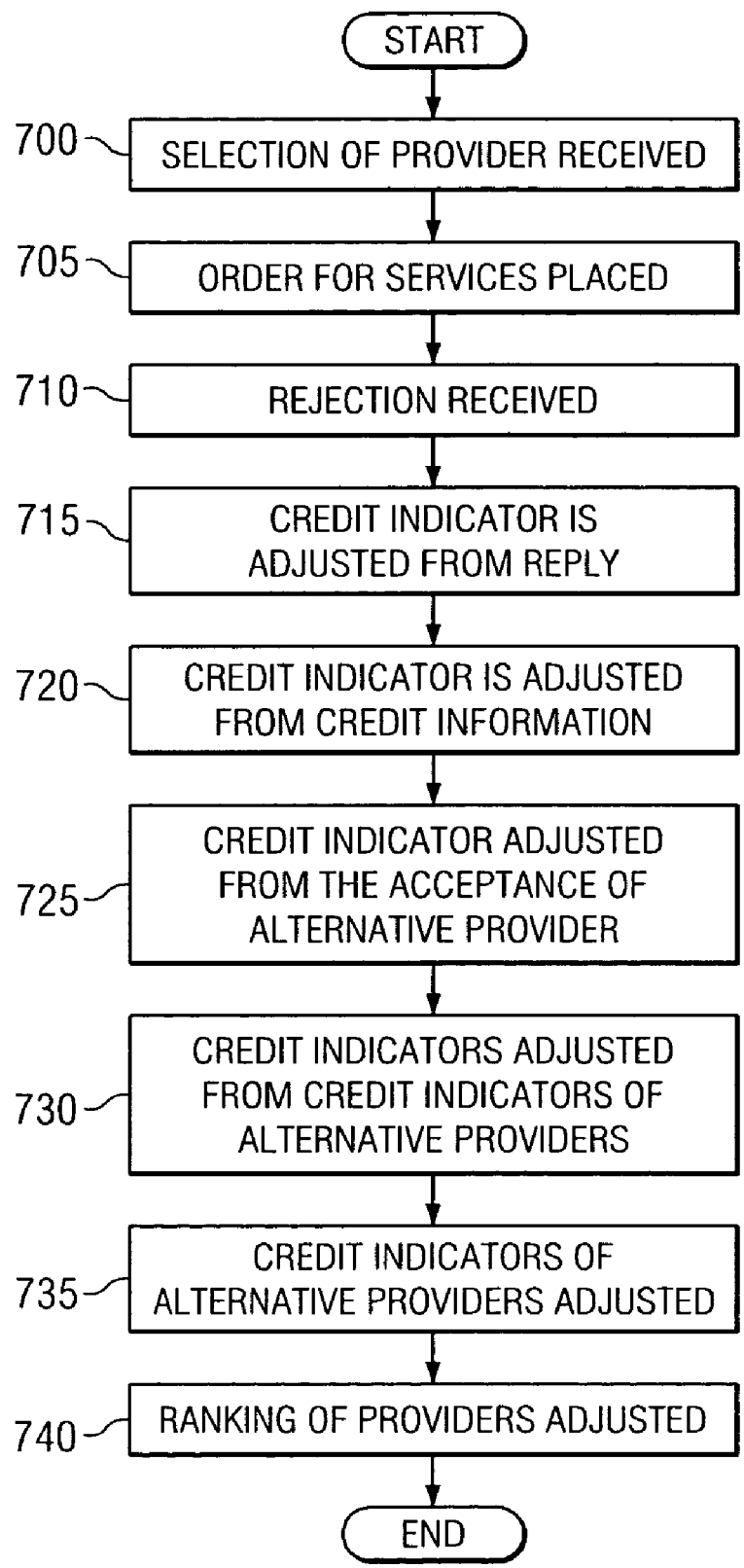
FIG. 7 illustrates an embodiment of a method of adjusting the relative credit difficulty rating of a particular service provider according to the teachings of the present invention.

Although the following description of FIGS. 1-5 refers to comparing alternative service plans, one inventive embodiment of the present invention's use of the system and processes described herein is the ability to accomplish the rerating of an existing service plan based on newer alternative service plans to ensure that the existing service plan is or remains the best option for the user. FIGS. 6 and 7 describe embodiments of the present invention directed to a process of identifying and rerouting the purchase request of a user to an alternative service provider if the user does not meet the credit requirements of a particular service provider. FIGS. 6 and 7 are further directed to a process for assessing and tracking the relative difficulty of qualifying for the credit requirements of a particular service provider as compared to alternative service providers.

System 10 includes a server 20 in communication with one or more clients 40 over a network 60. Network 60 may be one or more private or public networks using dedicated or switched links. For example, in one embodiment server 20 may be one or more servers or computers that may communicate using a public or private network while server 20 and clients 40 may communicate using a public network such as the Internet, whether connecting directly to the Internet, or connecting indirectly via a wireless network such as a cellular network or a Public Switched Telephone Network (PSTN). Each of the communications links making up network 60 may be implemented using fiber, cable, twisted-pair, satellite, radio, microwave, laser or other suitable wired or wireless links.

Server 20 includes a processor 22, a memory 24, a network interface 26, a message manager 28, a user database 30, a service plan database 32, a product database 34, an enterprise database 36, and ratings software 38. Server 20 may be one or more specialized or general-purpose computing platforms having processing components, memory, and communication interfaces sufficient to interact with and communicate data over network 60. Certain components of server 20 are identified according to functional purpose and may all be executed using the same or different software routines stored in one or more memory components and executed using one or more processing components including but not limited to processor 22, memory 24, and network interface 26.

Server 20 provides a web-based interface to the contents of transaction server 20. Server 20 may store web pages, JAVA servlets, and other suitable content and executables to enable users of system 10 to easily access the features and capabilities of server 20. In one embodiment, server 20 is a voice-enabled server allowing users the capability of using voice commands to access the content of server 20.

Processor 22 may be any suitable combination of hardware and software, including without limitation, a microprocessor, microcontroller, ASIC, or software engine. Memory 24 may be any suitable combination of volatile or nonvolatile memory, addressed using any suitable addressing scheme, and present in one or more separate physical devices. Network interface 26 may be any suitable interface including without limitation a modem, network interface card, network gateway, or transceiver.

Message manager 28 is a messaging platform capable of using one or more methods to generate notifications and communicate information to and from users, enterprises, vendors, customer support departments, and system administrators. For example, in one embodiment message manager 28 may be a web page or JAVA servlet by which users of system 10 may view messages generated by another user or automatically by message manager 28 in response to a user selection. Alternatively, message manager 28 may be an automated email, instant messaging, wireless paging, voicemail, or other suitable messaging application generating messages to send to a user to notify such user of events.

User database 30 is a database of user profiles maintained by system 10. User profiles may be profiles of an individual consumer or a business such as a business entity, information regarding which may be stored in enterprise database 36. User database 30 stores user information such as a personal identity, contact or financial information about each user of system 10. User database 30 may also store preference indicators of a particular user as to particular preferences of the user with regard to a product or service plan. User database 30 may also store prior use data associated with user's prior use of products and services. The financial information stored by user database may include information regarding the user's income, savings, debt, available credit, capitalization, payment history, bankruptcy, employment, credit scores, or any other suitable information (hereafter "credit information") that may be desirable to assess the financial status or credit worthiness of an individual or business.

Service plan database 32 and product database 34 store parameters of services and products respectively. Such parameters may include the requirements, options, costs, and features of products, services, or the purchase programs or service plans under which such products and services may be ordered.

Credit indicator database 33 stores credit indicators associated with the credit requirements of particular service providers. Such credit indicators may include any score, rating, scale, ranking, or other indicia associated with the ability of consumers or businesses (such as a business entity regarding which information may be maintained by system 10 in enterprise database 36) to meet any financial, capitalization, credit score, or payment history standard (hereafter a "credit requirement") imposed by a particular service provider.

For example, a credit indicator may be a relative credit difficulty rating associated with the comparative difficulty of qualifying for the credit requirements of a particular service provider as compared to other service providers. Such relative credit difficulty rating may instead be associated with the comparative difficulty of meeting the credit requirements of a particular service provider as compared to selected other service providers offering identical services or services that vary in scope only by a predetermined margin of difference. For example, the relative credit difficulty rating for a particular service provider offering both data and voice services may only be associated with other service providers who offer both data and voice services. In such a manner, a particular service provider may have a plurality of relative credit difficulty ratings, each corresponding to the particular service provider's relative credit difficulty as compared to a different grouping of service providers with which the particular service provider shares services or characteristics, such characteristics corresponding to requirements, options, costs, or features commonly associated with that grouping of service providers.

A credit indicator may also be an absolute indicator of credit requirements such as a credit score from one credit bureau, the average or median credit score from multiple credit bureaus, or a proprietary credit rating based on publicly available and/or confidential information about a consumer or business maintained or determined by system 10 or a third party system or entity.

Enterprise database 36 stores information associated with a particular business entity. Such information may include information on employees of such entity, consultants of such entity, or users of particular products and services utilized by the entity in running a business. Enterprise database may also include statistical information regarding any user or all users in aggregate, purchasing information of the entity, costs incurred by the entity, and the particular products and services used by employees and consultants of the entity.

Rating software 38 is a software module using one or more of fuzzy logic, rules-based software, and iterative algorithms operable to compare user information such as preference indicators and prior use data to parameters and features of a particular product or service. Rating software 38 may be stored in memory 24 and executed by processor 22 or stored and executed using other suitable resources.

In one embodiment, each of clients 40 is a personal computer; alternatively, clients 40 may each be a client, workstation, terminal, personal computer, web appliance, personal digital assistant, cellular telephone, pager or any other suitable computing device having input and output modules that enable a user to enter and view data. Clients 40 may each include a web browser or other interface software and/or hardware, volatile or non-volatile memory, processor and/or other processing components, and/or other software, hardware, and peripherals suitable for such computing devices.

Although server 20 and clients 40 are referred to in the nomenclature of a client/server environment, a single computing device or a peer-to-peer environment or any other suitable arrangement of computing devices may be utilized to practice the present invention.

In system 10, HyperText Transfer Protocol (HTTP) is used to communicate information between server 20 and clients 40. Alternatively, File-Transfer Protocol (FTP), Telnet, Usenet, mobile agents, cookies, paging, electronic mail, instant messaging, bulletin boards, or any other suitable link, protocol or communication technique may be utilized. Clients 40 may maintain and execute browsers or other suitable parsing programs for accessing and communicating information addressed by Uniform Resource Locators (URLs). Any suitable communications protocol may be implemented in combination with one or more generally available security and/or encryption techniques to ensure the secure, private communication of data between server 20 and clients 40.

In the illustrated embodiment, components of system 10 may be implemented in a programming environment that supports access or linking to various sources of information in system 10 using URL addresses. As such, the content of such modules and databases may be constructed using Hypertext Mark-Up Language (HTML), Extensible Mark-Up Language (XML), other forms of Standard Generalized Mark-Up Language (SGML), Virtual Reality Mark-Up Language (VRML), Javascript, or any other appropriate content development language. The modules of system 10 may also include program code, such as applets or servlets written in JAVA, or other appropriate self-executing code.

Although the components of transaction server 20 are illustrated in this FIG. 1 as separate databases, modules, subsystems and other illustrated components, each of such separate components may be implemented using a single processor for transaction server 20 such that the single processor accesses stored algorithms, executables, and other data that are stored in read-only memory, for example, and executed using random access memory. Likewise, such separate databases, modules, subsystems and other illustrated components may be combined, separated or distributed across one or more processing and/or memory devices. Memory for such databases, modules, subsystems, or other illustrated components of transaction server 20 may be implemented using one or more files, data structures, lists, or other arrangements of information stored in one or more components of random access memory, read-only memory, magnetic computer disks, compact disks, memory sticks, media cards, other magnetic, electronic, or optical storage media, or any other volatile or non-volatile memory.

Likewise, it should be understood that any components of system 10 may be internal or external to the illustrated components of system 10, depending on the particular implementation. Also, such databases, modules, subsystems or other components may be separate or integral to other components. Any appropriate referencing, indexing, or addressing information can be used to relate back to an address or location of a database, file or object within system 10.

Figure 2:
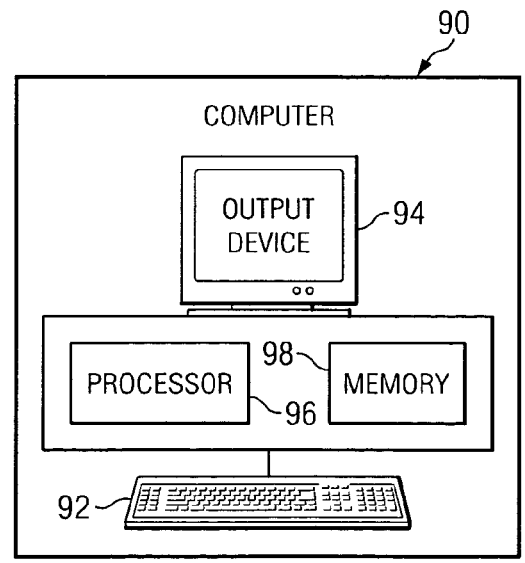
FIG. 2 is one embodiment of a computer used to implement various components of the system illustrated in FIG. 1.

Referring to FIG. 2, server 20 and clients 40 may operate on one or more computers 90. Each computer 90 includes one or more input devices 92 such as a keypad, touch screen, mouse, microphone, or other suitable pointer or device that can accept information. An output device 94, such as a speaker, monitor or other display, for example, conveys information associated with the operation of server 20, or clients 40, including digital data, visual information, and/or audio information. A processor 96 and its associated memory 98 execute instructions and manipulate information in accordance with the operation of system 10. For example, processor 96 may execute coded instructions that are stored in memory 98. Computer 90 may also include fixed or movable storage media such as a magnetic computer disk, CD-ROM, or other suitable media to either receive output from, or provide output to, server 20 and clients 40.

In operation, system 10 allows a user or enterprise to outline the preferences and requirements for and otherwise rate, compare, select, purchase, and evaluate products and software such as telecommunications devices and service plans in order to select the device or plan most suitable.

The rating of system 10 may be accomplished by collecting user information such as personal data, the preferences of a user in the form of indications of preference ("preference indicators"), and prior use data and comparing and scoring such alternative solutions using such preference indicators and prior use data. Such rating system and process allows a user to select a particular product, service, or service plan based on prior use data including such user's current or past usage patterns with similar products, services, or service plans. Such rating system and process may recommend that the user stop using a current product, service, or service plan in favor or a cheaper or higher quality alternative, or may alternatively recommend that such current product, service, or service plan be retained. The rating system and process can be used to select among devices, services, or service plans offered by a single provider, among the entire available universe of providers, or any other selection pool of providers.

In operation, such rating system and process includes a user entering user information which is then used to compare the features and other parameters of available products, services, and service plans. User information may include descriptive information concerning the user. For example, in rating a wireless device, wireless service, or service plan, such descriptive information may include personal data such as: identification information, registration information, password information, home and business address information, travel or commute information, or any other information concerning the user relevant to the purchasing or selection of a wireless device product, service, or service plan.

User information may further include prior use data regarding the user's history of use of similar products, services, or service plans. For example, in rating a wireless service or service plan, such prior use data may include: total minutes or average minutes used during a particular time interval, minutes used during certain times of day, minutes used during days of the week, physical locations where calls participated in were originated and received, number of minutes during calls originated, number of minutes during calls received, number of directory of assistance calls, number of minutes used for web access, number of emails sent and received, number of text messages sent and received, number of pages sent and received, number of voicemails received, number of dropped calls, number of customer service calls, number of wireless devices under a wireless plan, allocation of minutes used between such devices, details on voice and dialing features, service plan contract length, or type of existing wireless device.

User information may also include the user's preference indicators. For example, in rating a wireless service or service plan, such preference indicators may include allocated budget information including a cap on monthly service fees, desired coverage areas, desired network providers, desired phone manufacturers, desired contract length, whether a purchase of a new wireless device is desired, a specific indication of mandatory service requirements and desired optional service features, or any other desired product, service or service plan feature or parameter. Additionally, such preference indicators may include prioritization factors. Such prioritization factors may include a user utilizing a preference indicator that indicates a preference between service features, service costs, the coverage area, the quality of the delivered service, the quality of customer and/or technical support related to the delivered service allocation, or any other criteria including the user preference information described above or other factors related to the decision. A preference indicator may include a prioritization factor that may be a selection, ranking, weighting factor, percentage of importance to a decision, assignation of categories such as required, important, unimportant, range of acceptability for a particular factor, cap, floor, or any other factor useful in rating.

User information may be entered via a paper form, web page, telephone interface, or any other suitable input device or method. In one embodiment, user information can be received electronically from a third party such as a service provider via an electronic bill, record, account summary, plan description, or other source and translated or mapped into a rating form or rating fields used to perform the rating process. For example, an XML interface could be used to reformat data into a format acceptable for rating.

Once all applicable user information has been received, the information is analyzed and used to compare user information to features and characteristics of different available products, services, or service plans (hereafter "alternatives") to achieve one or more rankings of such alternatives. Such comparison can be performed using fuzzy logic, a rules-based software engine, or an iterative algorithm. Following or during such comparison a software algorithm scores such alternatives and/or a user's current product, service, or service plan. Such comparison and scoring may take into account the preference indicators determined by the user or default preference indicators stored by the rating system. After such comparison and scoring, one or more ranked lists or comparisons may be presented to a user. Such ranked lists or comparisons may be presented to a user in an order of importance determined using the above-described preference indicators, or in alternative orders of importance based on a listing factor selected by the user (cost, number of included minutes, quality of service delivered rating, customer service rating, etc.).

One embodiment of a rating process used to select a service plan includes receiving user information including user preferences and preference indicators. Some preference indicators may be designated as mandatory requirements by a user or enterprise. First, alternatives are compared to preference indicators to remove service plans that do not meet mandatory requirements. For example, service plans that: have a mandatory service contract length, require the purchase of a new phone, or do not have coverage area for a specific geography may be eliminated. Second, alternatives are compared to preference indicators to select service plans that best satisfy the one or more user preferences ranked as most important, having the highest weighting factor, percentage of importance, etc. Such alternatives may be assigned a preliminary score or ranking at any time during comparison to preference indicators. Next, user preferences assigned a lower weight or ranking via a preference indicator are compared and the preliminary ranking may be adjusted in response to such comparison. For example, a service plan scoring 100% or ranked first based on the most important user preferences may have its scored reduced according to a weighting factor of the next most important user preference if such service plan does not fully satisfy such next most important user preference. The rating process may be repeated in an iterative fashion or according to rules maintained by the rating system. For example, a default rule may be used that a user never be presented with a service plan having more than 200% of the minutes used by his current plan unless it costs less than such user's current plan.

Service plans may also be compared to other user information to determine if a plan is otherwise appropriate for a particular user. For example, prior use data can be combined with preference indicators to prepare a suitably robust model for comparison to available service plans. Prior use data may otherwise exclude a particular plan based on excessive cost if prior use continues as previously conducted. Prior use data may also enable reduced rates on service plans offered by service providers to attract heavy users of wireless devices, a particular market segment, or enterprises with a history of high use spread across a pool of users. Once all of the available data is analyzed and a final ranking, scoring, comparison results, or other subjective rating is determined, the information is presented to a user in a suitable form to enable a final selection of a service plan by a user. For example, the overall best match, the top five scorers, the cheapest service meeting mandatory requirements, or the highest quality service meeting mandatory requirements, or a combination of any of the foregoing, may be presented to the user.

The rating process may be integrated with a purchasing system and process to enable a user to complete an end-to-end process resulting in the purchase and activation of a finally selected service plan for the user. In one embodiment, purchase information, a purchase contract, or an application for service is automatically populated from the user information used to perform the rating process. The rating system may be implemented using any server/client arrangement and may include a processor, memory, and user interface to execute the rating process. For example, the rating service may be offered on a web server to users accessing a website on the Internet.

The rating process can store historical data regarding user information and prior use data. By analyzing usage patterns in such historical data over time, better recommendations can be made and more accurate scoring and/or ranking of alternative service plans can be accomplished. For example, a single monthly bill may be an unrepresentative view of usage patterns. If data is collected over the course of a longer period such as a full year, the rating process may better account for spikes in usage during particular months (December for example) versus more typical usage during other months.

The rating process also allows several users' information and prior usage data to be grouped and even sub-grouped. This allows for analysis, scoring and recommendations based on family, company, or group. Looking at the full set of data for the entire group may lead to different recommendations or scoring of service providers then an analysis of individual users within such group. In such a manner, organizations can aggregate users for purposes of analyzing costs and other benefits of alternative service plans, services, or providers.

In the rating process, hypothetical data can be applied to historical data to allow users to see the cumulative affect of a decision based on choices they are considering. For example, a user may want to see how much they would have spent during the prior year if they had chosen a different rate plan. The user could also see how much the selection of a particular plan feature would increase or decrease their cost. Additional modeling can be presented to user based on any combination of historical data, hypothetical data, available service plan parameters, and budgeting constraints.

The results of a rating process can be integrated within a customer service model of a particular service provider. More specifically, risk factors affecting spikes in cost can be assessed based on prior user data or other historical data. For example, if a service plan was selected with a significant cost component associated with minutes of use in excess of a base minute limit, reminders could be sent to a user nearing such base minute limit through text or voice messages to an associated wireless device, email address, or any other suitable notifications mechanism. Reminders can also be based on any usage trends or statistics or any service plan parameter. For further example, if a user's trends indicate certain spikes in usage during particular times, further messages can be sent to the user based on this data. Usage data may be analyzed continuously during the term of use of a service and in response to such analysis a user may be notified of: (i) usage spikes or trends that would indicate that the user is trending to use that is outside their normal usage bounds and/or budgeted amount; or (ii) an alternative service plan available that would decrease their overall cost.

The rating process can be used for a particular device or service such as voice services or data services. Alternatively, the rating process may rate or recommend products, services, or service plans using a combined metric of voice service information and data service information. In such a manner, comparisons can be made that may recommend using a single product, service, service plan, or provider for both voice and data, or a first option for voice services and a second option for data services. In such a manner, the metrics of multiple services can also be optimized for the best selection of overall cost, quality of service, and available features.

The ranking, scoring, or comparison of products, services, or service plans may also be configured to take into account preferred or featured providers or their products, services, or services. For example, ranking, scoring, or comparison results can be configured to only present to a user, or present to a user at the top of an ordered overall list or in an otherwise highlighted fashion, providers that: achieve a specific best buy or recommended rating or other designation; receive an award from an industry organization, consumer protection organization, or other entity for quality, customer service, or any other desirable attribute; or maintain a preferred relationship with the entity performing the rating such as a marketing relationship or referral arrangement.

Additionally, the rating tool can be integrated with resource management systems to enable businesses and enterprises collect information regarding user information and cost information for a relevant pool of employees and/or contractors and optimize resources and minimize costs within such business or enterprise. In such a manner, the rating tool could be utilized as an employee tracking tool to monitor employee use of particular products and services and/or the cost of doing so. The rating tool could be further integrated with business accounting/expense management systems to allow cost modeling and enable the direct routing of purchasing requests from individual employees for approval to appropriate management resources.

Now referring to FIG. 3, one embodiment of a method for rating alternative telecommunications service plans is disclosed according to the teachings of the present invention. The method may be practiced using the components of FIGS. 1 and 2 or any other suitable systems, devices, networks, and other components. In step 310, preference indicators associated with a user are received. In step 320, prior use data associated with the user is received. In step 330, alternative telecommunications service plans and their features and other parameters are compared to the preference indicators in the prior use data. In step 340, the alternative telecommunications service plans are rated in response to the comparison.

In step 310, the preference indicators that are received may designate mandatory requirements of a user or enterprise for any telecommunication service plans. Thus, in step 330, comparing the alternative telecommunication service plans to the preference indicators may include determining which of the alternative telecommunication service plans meet the mandatory requirements.

In step 310, receiving preference indicators may include receiving preference indicators associated with a family, group, organization, or other combination of users such as an enterprise or business entity. Step 320 may also include additional prior use data associated with such additional users. Thus, the comparison of alternative telecommunication service plans to preference indicators and prior use data may be done for a group of users and the rating accomplished in step 340 may therefore rate alternative telecommunication service plans after considering preference indicators and prior use data across a group of users.

Step 330 may be accomplished using fuzzy logic software, rules-based software, or iterative algorithms. Step 330 may include first comparing alternative telecommunication service plans to mandatory requirements of a user, group of users, or enterprise and eliminating alternative telecommunication service plans that do not meet such mandatory requirements. A comparison may then be done of preferred or desirable features that a user may request to the features or other parameters of the alternative telecommunications service plans that meet those mandatory requirements.

The rating accomplished in step 340 may include assigning a score to one or more of the alternative telecommunication service plans. Rating may also include ranking of telecommunication service plans based on the results of the comparison. Rating may also include assigning a rating such as a "best match" designation, recommended designation, or other text or graphical designation indicating a relative rating of the alternative telecommunication service plans. Rating may also include presenting a graphical or textual side-by-side tabulation of features or other parameters of the alternative telecommunication service plans that can be presented to a user or stored for later access. Rating may be further conducted based on the cost, number of minutes, quality of service, or any other parameters set by a user, a vendor of the telecommunication service plans, or an entity responsible for the rating process. Rating may also be accomplished in response to a recommendation or award by an industry, organization, vendor, or other entity or group. Rating may further be accomplished in response to a preferred relationship such as a preferred vendor relationship associated with any of the vendors of the alternative telecommunication service plans.

The preference indicators received in step 310 may already be ranked, weighted, or otherwise prioritized by a user.

Referring to FIG. 4, a method of rating alternative service plans and monitoring use of such plans is disclosed. At step 410, prior use data associated with a user is received. Such prior use data may include use data of a user during a current month or other term of a service plan. In step 412, a cost associated with the user for the service plan is determined in response to receiving the prior use data. In step 414, a notification is generated if the determined cost exceeds a predetermined threshold. In step 416, a request for a new product or service associated with the user is received. In step 418, a notification is generated in response to receiving the request. In step 420, an approval is received in response to the generated notification. In step 422, a purchase is initiated in response to the received approval. In such a manner, upon receipt of an approval a purchase can be initiated, a transaction conducted, and the delivery of a product or service fulfilled automatically by a system such as system 10. In step 424, a database of an enterprise is updated in response to receiving the prior use data. In step 426, the prior use data is compared to historical data stored in the database. In such a manner, the prior use data can be analyzed relative to the historical data. In step 428, the prior use data of the user is compared to additional use data of other users.

The prior use data received in step 410 may include the number of minutes used of a service during the present month. In such event, determining the cost in step 412 can include comparing the received number of minutes to a threshold. The notification generated in step 418 may include a notification that the number of units available in a current service plan have been exceeded or a notification that an alternative service plan is available that would reduce the cost of a service.

A rating of a service plan may include determining the cost of the service plan during at least one historical billing period in response to the received prior use data.

In step 430, hypothetical use data associated with a user is received. In step 432, the hypothetical use data is used to rate at least one of the alternative telephone service plans by determining the cost of the plan during at least one future billing internal using the hypothetical use data. In step 434, rating at least one of the alternative telecommunication service plans may be accomplished by determining the cost of the at least one of the alternative telecommunication service plans during at least one future billing period using hypothetical use data derived from the prior use data. In step 436, the cost of at least one of the alternative service plans is discounted in response to the prior use data received in step 410. Such costs may be discounted, for example, in response to comparing the prior use data to at least one threshold or in response to the number of individual users associated with the user for which the prior use data was received. For example, a user who is part of a larger business entity or is seeking subscription to a service plan as part of a family, larger organization, or other pool of users may receive a discount.

Now referring to FIG. 5, a method of rating alternative data and voice communication service plans is disclosed. At step 510, preference indicators associated with one or more users are received. At step 520, the alternative service plans are compared to the preference indicators of the users. In step 530, the service plans are rated in response to the comparison. The comparison accomplished in step 520 may include comparing a first combination of a data communication service plan and a voice communication service plan offered by the same vendor to a second combination of a data communication service plan and a voice communication service plan offered by two different vendors. Step 520 may also include comparing preference indicators that are associated with a communications device to the features of communications devices available or otherwise compatible with the service plans.

Now referring to FIG. 6, one embodiment of a method of selecting an alternative service provider is illustrated. In step 600, a selection of a particular provider of telecommunication services is received. The selection is associated with a buyer who desires to purchase telecommunication services from the particular provider. In step 605, credit information associated with the buyer is compared to credit indicators associated with the particular provider. Alternatively, or additionally, in step 610 the buyer's request to purchase telecommunication services is communicated to the particular provider, a third party associated with the particular provider, or automatically accepted or rejected in response to an inquiry to and response from a credit bureau. If step 610 is performed, in step 615, a response is received from the particular provider or the associated third party.

In step 620, either in response to a comparison performed in step 605 and/or a response received in step 615, an acceptance or rejection of a request of the buyer to purchase telecommunication services from the particular provider is determined. In step 625, if a rejection was determined in step 620, the credit indicators associated with the particular provider are compared to credit indicators associated with alternative providers of telecommunication services. For example, if credit indicators of different providers are expressed relative to each other in terms of a ranking or rating of credit requirements, alternative providers with a lower ranking or rating may be identified as potentially available for the buyer. Alternatively or additionally, in step 630, preference indicators or prior use data associated with the buyer may be compared to features associated with service plans offered by, or other parameters associated with, the alternative providers. Alternatively or in addition to the comparisons performed in steps 625 and 630, in step 635, credit information associated with the buyer may be directly compared to credit indicators associated with the alternative providers.

In step 640, in response to one or more of the comparisons that may be performed in steps 625, 630, or 635, one or more alternative service providers are selected as potential providers from whom the buyer may be able to purchase telecommunication services. In one embodiment, a provider of prepaid telecommunication services is identified. The selection made in step 640 may again be processed by the method described in this FIG. 6 by returning to step 600. The method may be iteratively repeated until a provider is selected that approves a purchase request associated with the buyer.

In one embodiment, approval may be necessary before a purchasing request may be sent to alternative providers. In another embodiment, a purchase may be automatically requested and accepted without the need for further communication with a buyer or the buyer's representative. Such an embodiment may include an option for automatic alternative provider selection that is pre-approved by a user upon sign-up or submission of an initial purchasing request.

All of the steps described in this FIG. 6 may be performed on a single server such as the one used in system 10, or, alternatively or additionally, may involve one or more other servers maintained by one or more entities such as a reseller of telecommunication services, one or more providers of telecommunication services, a credit bureau, or any other suitable entities.

For example, a reseller may utilize the method described in this FIG. 6 or system 10 to track and predict the credit requirements of a service provider, without having access to the actual data and processes used by the service provider to make credit decisions. In such an embodiment, the actual decision as to acceptance of a purchasing request is made by the provider and furnished to the reseller or buyer. In such an embodiment, the method described in this FIG. 6 or system 10 may actually "learn" more about the decision-making process and credit requirements of a provider during a period of time in which the method described in this FIG. 6 or system 10 interacts with the provider, as further described in FIG. 7.

Alternatively, a reseller may be furnished with exact credit requirements of a service provider. In such an embodiment, the method described in this FIG. 6 or system 10 would itself act as a gate-keeper as to which purchasing requests are suitable for the credit requirements of a particular provider and accepts or rejects such purchasing requests on behalf of the provider.

Now referring to FIG. 7, an embodiment of a method of adjusting a relative credit difficulty rating of a particular provider of telecommunication services is illustrated. In step 700, a selection of a particular provider of telecommunication services is received, the selection being associated with a buyer. In step 705, an order for telecommunication services is placed with the particular provider.

In step 710, a reply associated with the particular provider is received in response to placing the order, the reply indicative of a rejection of the order, the rejection determined in response to determining that the buyer does not meet the credit requirements of the particular provider. Such determination may be reached using credit information of the buyer, obtaining a credit report of the buyer, or using any other suitable data or process.

In step 715, a credit indicator of the particular provider is adjusted in response to the reply received in step 710. Alternatively or additionally, in step 720 a credit indicator of the particular provider is adjusted in response to the credit information of the buyer. Alternatively or additionally, in step 725 a credit indicator of the particular provider is adjusted in response to the acceptance of an order of the buyer by an alternative provider. Alternatively or additionally, in step 730 a credit indicator of the particular provider is adjusted in response to the credit indicators of the alternative provider.

In step 735, the adjustment of the credit indicator of the particular provider automatically adjusts credit indicators of other providers. In step 740, the adjustment of the credit indicator of the particular provider automatically modifies a ranking of service providers. In such a manner, the process of FIG. 7 can be utilized to track the credit requirements of a provider relative to other providers in real-time based on rejections of purchasing requests by the provider.

Although particular embodiments of the present invention have been explained in detail, it should be understood that various changes, substitutions, and alterations can be made to such embodiments without departing from the spirit and scope of the present invention as defined solely by the following claims. In particular, although the majority of the embodiments described herein are described in terms of the rating of service plans, such rating embodiments can be used to rate any product, service, or solution.

What is claimed is:

1. A system for purchasing and activating telecommunication service plans from a user preferred telecommunication services provider, the system comprising:
    a server in communication with one of a plurality of clients over a network, wherein the server performs a method stored in a storage medium and executed by one or more processors comprising:
    receiving a selection of at least one telecommunication services provider and telecommunication services associated with the selected at least one telecommunication service provider from a buyer;
    comparing credit information associated with the buyer to credit indicators associated with the selected at least one telecommunication services provider;
    determining that the buyer does not meet credit requirements of the selected at least one telecommunication services provider;
    identifying one or more alternative telecommunication service providers, wherein the one or more alternate telecommunication service providers offer the selected telecommunication services associated with the selected at least one telecommunication services provider;
    ranking the identified one or more alternate providers of telecommunication services based on alternate provider credit indicators for each of the identified one or more alternative telecommunication services provider;
    comparing the credit information associated with the buyer to the alternate provider credit indicators associated with each of the identified one or more alternative providers of telecommunication services; and
    selecting at least one of the identified one or more alternative providers of telecommunications services from which the buyer may purchase the selected telecommunication services in response to determining that the buyer does not meet the credit requirement of the selected telecommunication services provider;
    wherein the telecommunication services provider offers a service plan with one or more features and receiving a request from the buyer related to at least one of the features, and wherein the selection of at least one of the identified one or more alternative providers of telecommunication services is made in response to comparing the requested at least one of the features of the service plan to the features of alternative service plans associated with at least one of the identified one or more alternatives providers of telecommunication services.

2. The system of claim 1, wherein selecting at least one of the plurality of alternative providers of telecommunication services further comprises selecting at least one of the identified one or more alternative providers of telecommunication services with lower credit requirements.

3. The system of claim 1, wherein the telecommunication services provider is associated with features of a service plan and wherein the selection of at least one of the identified one or more alternative providers of telecommunication services is made in response to the features of the service plan.

4. The system of claim 1, wherein the telecommunication services provider is associated with features of a service plan and wherein the selection of at least one of the identified one or more alternative providers of telecommunication services is made in response to the credit requirements of the plurality of alternative providers of telecommunication services and the features of a service plan.

5. The system of claim 1, wherein the plurality of alternative providers of telecommunication services comprises at least one telecommunication services provider of prepaid services.

6. The system of claim 1, wherein the telecommunication services provider is associated with features of a service plan and wherein the selection of at least one of the identified one or more alternative providers of telecommunication services is made in response to comparing the features of the service plan to the features of alternative service plans associated with at least one of the plurality of alternatives providers of telecommunication services.

7. A system for selecting at least one of a plurality of alternative providers of telecommunication services, the system comprising:
    a first database configured to store a selection of at least one telecommunication services provider and telecommunications services associated with the selected at least one telecommunication service provider from a buyer, wherein the telecommunication services are associated with selected at least one telecommunication services provider;
    a processor in communication with the first database, the processor configured to determine that the buyer does not meet credit requirements of the selected at least one telecommunication services provider, the process further configured to identify one or more alternative telecommunication service providers, wherein the one or more alternate telecommunication service providers offer the selected telecommunication services associated with the selected at least one telecommunication services provider, the processor further configured to rank each of the identified one or more alternative providers of telecommunication services other than the selected telecommunication services provider based on alternate provider credit indicators and select at least one of the identified one or more alternative providers of telecommunication services in response to determining that the buyer does not meet the credit requirements of the selected at least one telecommunication services provider wherein the telecommunication services provider offers a service plan with one or more features and receiving a request from the buyer related to at least one of the features, and wherein the selection of at least one of the identified one or more alternative providers of telecommunication services is made in response to comparing the requested at least one of the features of the service plan to the features of alternative service plans associated with at least one of the identified one or more alternatives providers of telecommunication services.

8. The system of claim 7, and further comprising a second database in communication with the processor and configured to store credit indicators associated with each of the identified one or more alternative providers of telecommunication services, the processor configured to select at least one of the identified one or more alternative providers of telecommunication services in further response to the credit indicators.

9. The system of claim 7, and further comprising a second database in communication with the processor and configured to store features of at least one service plan of the telecommunication services provider and further features of at least one service plan associated with each of the identified one or more alternative providers of telecommunication services, the processor configured to select at least one of the identified one or more alternative providers of telecommunication services in response to comparing the features to the further features.

10. The system of claim 7, and further comprising a second database in communication with the processor and configured to store credit indicators associated with each of the identified one or more alternative providers of telecommunication services, the second database further configured to store features of at least one service plan of the selected telecommunication services provider and further features of at least one service plan associated with each of the identified one or more alternative providers of telecommunication services, the processor configured to select at least one of the identified one or more alternative providers of telecommunication services in further response to the credit indicators and comparing the features to the further features.

11. The system of claim 7, and further comprising a second database in communication with the processor and configured to store the identified one or more alternative providers of telecommunication services, the identified one or more alternative providers of telecommunication services including at least one provider of prepaid services.

12. The system of claim 7, and further comprising a second database in communication with the processor and configured to store features of at least one service plan of the selected telecommunication services provider and further features of at least one service plan associated with each of the identified one or more alternative providers of telecommunication services, the processor configured to select at least one of the identified one or more alternative providers of telecommunication services in response to comparing the features to the further features.

13. The system of claim 7, wherein the first database further includes an indication of at least one required feature associated with the buyer and further comprising a second database in communication with the processor and configured to store further features of at least one service plan associated with each of the identified one or more alternative providers of telecommunication services, the processor configured to select at least one of the identified one or more alternative providers of telecommunication services in response to comparing the at least one required feature to the further features.

\* \* \* \* \*